(12) United States Patent
Barkic et al.

(10) Patent No.: US 7,775,708 B2
(45) Date of Patent: Aug. 17, 2010

(54) DEVICE FOR THERMAL COUPLING

(75) Inventors: Dubravko Barkic, Illingen (DE); Guenther Biberger, Marbach Am Neckar (DE); Jacek Mendes, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 234 days.

(21) Appl. No.: 11/914,641

(22) PCT Filed: Jul. 5, 2006

(86) PCT No.: PCT/EP2006/063910

§ 371 (c)(1),
(2), (4) Date: Nov. 16, 2007

(87) PCT Pub. No.: WO2007/023015

PCT Pub. Date: Mar. 1, 2007

(65) Prior Publication Data

US 2008/0212647 A1 Sep. 4, 2008

(30) Foreign Application Priority Data

Aug. 23, 2005 (DE) .................. 10 2005 039 764

(51) Int. Cl.
*G01K 1/00* (2006.01)
*G01K 7/00* (2006.01)
(52) U.S. Cl. .................. 374/141; 374/208; 374/163
(58) Field of Classification Search .................. 374/163, 374/208, 141
See application file for complete search history.

(56) References Cited

U.S. PATENT DOCUMENTS

| 5,588,748 | A | * | 12/1996 | Nomura et al. | 374/158 |
| 2002/0037026 | A1 | * | 3/2002 | Sato et al. | 374/132 |
| 2002/0080852 | A1 | * | 6/2002 | Mirov | 374/208 |
| 2003/0081647 | A1 | * | 5/2003 | Bretl et al. | 374/49 |
| 2003/0086477 | A1 | * | 5/2003 | Tola | 374/208 |
| 2004/0203276 | A1 | * | 10/2004 | Kajiura et al. | 439/488 |

FOREIGN PATENT DOCUMENTS

| DE | 3126931 A1 | 2/1983 |
| EP | 0359007 A2 | 3/1990 |
| JP | 60-198441 | 10/1985 |

OTHER PUBLICATIONS

PCT/EP2006/063910 International Search Report.

* cited by examiner

*Primary Examiner*—Gail Verbitsky
*Assistant Examiner*—Mirellys Jagan
(74) *Attorney, Agent, or Firm*—Michael Best & Friedrich LLP

(57) ABSTRACT

The invention relates to a device (10), in particular, for a motor vehicle, for thermally coupling a temperature sensor (12) to an element (20) whose temperature is to be determined. The temperature sensor (12) and the element (20) are connected together in an at least thermal manner by means of a heat-conductive medium. The temperature sensor (12) is arranged in a recess (26) of the element (20) and the medium is embodied as a flexible film (28) which is at least in partial contact with the temperature sensor (12) and a wall (38) of the recess (26). The invention also relates to a corresponding method which is used to thermally couple a temperature sensor (12) to an element (20) whose temperature is to be determined. A heat-conductive medium is arranged between the temperature sensor (12) and the element (20).

21 Claims, 2 Drawing Sheets

DEVICE FOR THERMAL COUPLING

BACKGROUND OF THE INVENTION

The invention relates to a device, in particular for a motor vehicle, for a thermal coupling of a temperature sensor to an element, whose temperature is to be determined, as well as a corresponding method to manufacture a thermal coupling of a temperature sensor to an element, whose temperature is to be determined.

The aforementioned device and the cited method are known from the prior art. Thus, for example, dissipating the high thermal power loss from transistors to the environment via heat sinks is known. In order to protect the transistors from thermal overload, either protected transistors with integrated thermal protection are used or the temperature protection is realized via an external temperature sensor, which is thermally coupled to the heat sink and thus to the transistor by means of a heat-conducting paste or casting compound. If the temperature exceeds a predetermined limit value, the power of the transistor is reduced correspondingly. This process is also used in motor vehicles, in particular for linear air conditioner regulators. However, it has turned out to be disadvantageous with respect to production costs that, in the case of the known process, drying times must be observed and/or special measures must be taken for drying the heat-conducting paste or casting compound. If transistors with integrated thermal protection are used, the disadvantages that are associated with these transistors and higher part costs must be accepted.

SUMMARY OF THE INVENTION

In the case of a device, in particular for a motor vehicle, for a thermal coupling of a temperature sensor to an element whose temperature is to be determined, wherein the temperature sensor and the element are connected together at least thermally by means of a heat-conducting medium, it is proposed in accordance with the invention that the temperature sensor be arranged in a recess of the element and the medium be embodied as a flexible film, which is in at least partial contact with the temperature sensor and with a wall of the recess. In the case of the element whose temperature is to be determined, we are dealing predominantly with an element with low thermal resistance, which heats up and cools off with the heat-generating component. Since the medium is embodied as a flexible film, the thermal connection of the temperature sensor can be realized simply and in a manner favorable for manufacturing. Now drying times no longer need to be observed thereby making it possible to achieve a higher manufacturing rate. Since the film lies between the wall of the element and the temperature sensor, it is possible to achieve a good thermal coupling, particularly when the temperature sensor is sitting snuggly in the recess with the film. In this case, the concept of the film should be understood to the effect that here we are dealing with a fixed heat-conducting element, which has a predominantly two-dimensional expansion and specific elastic properties.

On the other hand, it is not necessary for the film to have a negligible thickness. The concept of the temperature sensor should be understood very generally as a component, which is suitable for detecting a temperature and/or a temperature change, if necessary with the aid of measuring means.

The film is preferably compressible. The thermal coupling can be improved as a result. In areas in which the temperature sensor is almost directly adjacent to the wall, the film is then compressed, while in locations where spaces remain between the temperature sensor and the wall of the element, e.g., because the design of the temperature sensor is not plane, it may be compressed or be compressed only partially and thereby fill up the space.

In another development of the invention, the temperature sensor is arranged on a printed circuit board. This is advantageous on the one hand with respect to the electric connection, but on the other hand also for the mechanical fastening.

The temperature sensor is preferably embodied as a SMD component. The thermal coupling can be realized especially well with this type of component, because of its geometry. The SMD component can be a resistor with a positive or a negative temperature coefficient (PTC, NTC), for example.

Semiconductor elements are advantageously arranged on the printed circuit board, and these semiconductor elements are in electrical contact with the printed circuit board and are in thermal contact with the element. Manufacturing is simplified further in this manner. During manufacturing, the printed circuit board can first be manufactured with all electrical components, including the semiconductor elements to be cooled (e.g., power transistors). In an assembled state, the semiconductor elements are then adjacent to the element, which cools them, and the temperature sensor is thermally coupled to the element.

The film advantageously has contact on at least two sides of the wall, wherein the film is inserted in a U-shaped manner in particular. Thus, the thermal coupling can be improved, in that the effective heat transfer surface between the temperature sensor and the element is enlarged. Said U-shape can be achieved especially simply by a method, which will be chronicled in the further course of this application.

In a preferred embodiment, the recess features a U-shaped cross section. This is generally advantageous for the thermal coupling and in particular for achieving the U-shaped enclosure.

It is advantageous if the element is a heat sink. A heat sink can dissipate quite a bit of heat from the components that are to be cooled.

One obtains an advantageous embodiment, if the printed circuit board is arranged on a plug holder, which is in at least partial positive connection with the element. This represents a further simplification of the production process since no additional measures are required for positioning and fastening the printed circuit board. Since the plug holder regularly has a fixed position to the element in the finished mounted state, the coupling of the temperature sensor is thereby secure and positionally independent and is also maintained in the case of stress from vibration.

The invention relates further to a method for manufacturing a thermal coupling of a temperature sensor to an element whose temperature is to be determined, wherein a heat-conducting medium is arranged between the temperature sensor and the element, moreover, a recess is embodied in the element, the recess is covered at least partially with a flexible film as a medium and the temperature sensor is pressed into the recess carrying the film along with it. In this case, depending upon the embodiment of the dimensions of the film and the recess, it is possible for the film to be completely or only partially pressed into the recess. The process will be explained further on the basis of the exemplary embodiment.

BRIEF DESCRIPTION OF THE DRAWINGS

The invention will be explained in more detail below on the basis of an exemplary embodiment. The drawings show.

DETAILED DESCRIPTION

Figure 1:
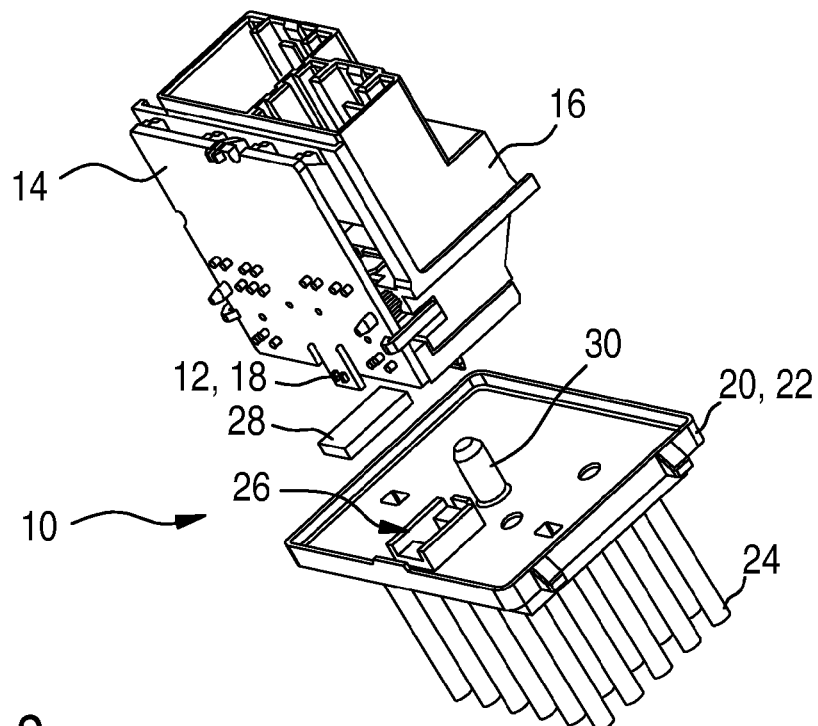
FIG. 1 A plug device with a heat sink

FIG. 1 shows a three-dimensional view of the elements that are a part of the device 10, wherein the temperature sensor 12 is arranged on a printed circuit board 14, which is fastened in turn on a plug holder 16. The temperature sensor 12 is embodied in this case as a SMD resistor 18. The element 20 whose temperature is to be determined is a heat sink 22 with cooling ribs 24 in this case. A recess 26 is arranged in the heat sink 22. Furthermore, a flexible film 28 is depicted as a heat-conducting element, which film is positioned over the recess and then, in an assembled state, is at least partially in contact with the temperature sensor and with a wall of the recess 26. A cylindrical projection 30 is shown on the heat sink 22, which, in an assembled state, engages in a counter element (not shown) in the plug holder 16 so that the plug holder 16 is held on the heat sink 22. Reference is made to the fact that all reference numbers inserted in all figures are used with the same meaning.

Figure 2:
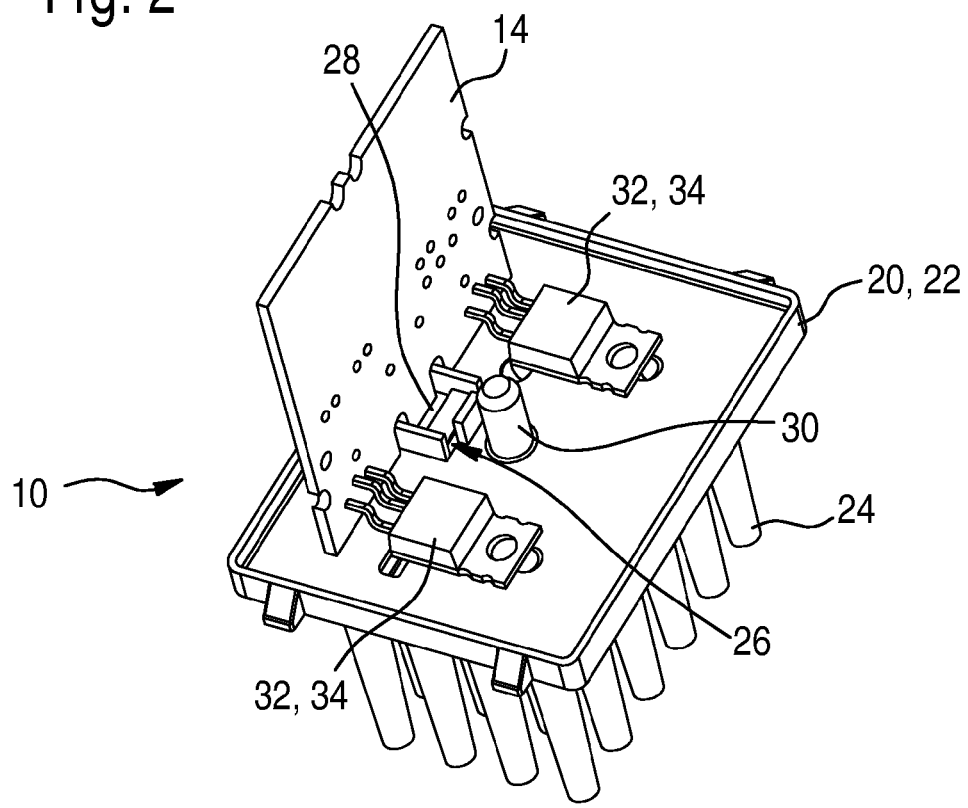
FIG. 2 A printed circuit board with transistors on a heat sink

FIG. 2 depicts how the semiconductor elements 32 would be cooled, in this case power transistors 34, are connected electrically to the printed circuit board 14 and thermally to the heat sink 22. In addition, it shows that, now in an assembled state, the film 28 is pressed into the recess 26.

Figure 3:
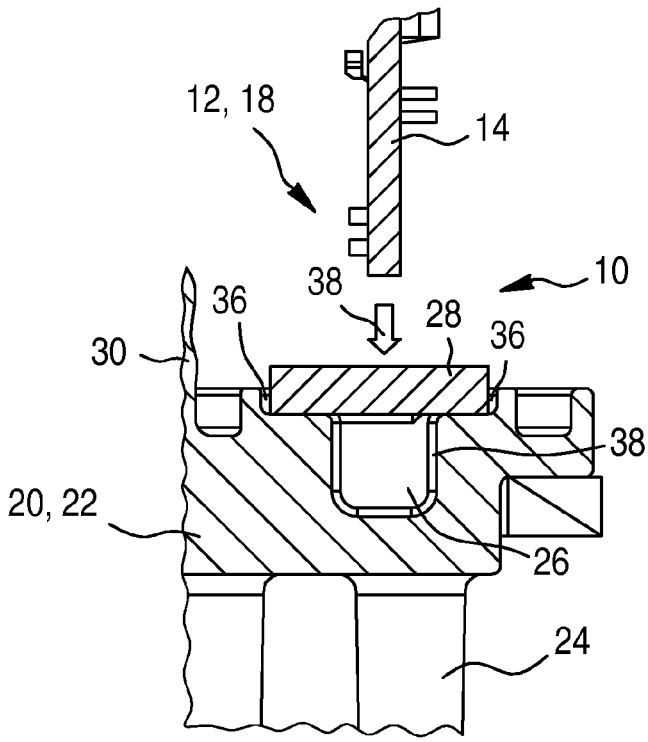
FIG. 3 A sectional view at the point in time before the temperature sensor is inserted into the recess FIG. 4 A sectional view of the device in a joined state

The device 10 is depicted in a sectional view in FIG. 3 and namely at the point in time before the temperature sensor 12 is inserted into the recess 26. It is evident that the film 28 is wider than the recess 26 and therefore at least partially covers the recess 26. In the case of this exemplary embodiment, small indentations 36 are also provided for positioning the film 28. The printed circuit board 14 with the temperature sensor 12 is positioned over the film 28 and the recess 26, and is now moved in the direction of the large arrow 38. When contact is made with the film 28, it is pressed into the recess 26.

Figure 4:
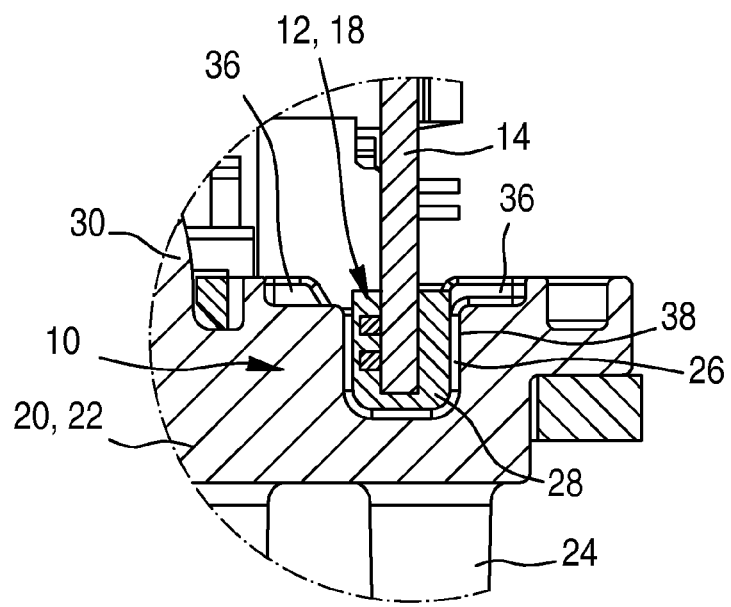

FIG. 4 finally shows the finished device 10 in an assembled state. The film 28 is now adjacent to the wall 38 of the recess 26 in a U-shaped manner. Since in this case, we are dealing with a compressible film 28, the film 28 was heavily compressed in the area of the projections of the temperature sensor 12, while this is the case to a lesser degree in the other areas. This clearly shows that a very good thermal coupling exists both between the temperature sensor 12 and the film 28 as well as between the film 28 and the recess 26.

The invention claimed is:

1. A device (10) for a thermal coupling of a temperature sensor (12) to an element (20) whose temperature is to be determined, wherein the temperature sensor (12) and the element (20) are connected together at least thermally by means of a heat-conducting medium, characterized in that the temperature sensor (12) is arranged in a recess (26) of the element (20) and the medium includes a flexible film (28), which is in at least partial contact with the temperature sensor (12) and with a wall (38) of the recess (26), and characterized in that the temperature sensor (12) is arranged on a printed circuit board (14).

2. A device (10) according to claim 1, claim 1, characterized in that the temperature sensor (12) includes a SMD component (18).

3. A device (10) according to claim 1, characterized in that semiconductor elements (32) are arranged on the printed circuit board (14), which are in electrical contact with the printed circuit board (14) and are in thermal contact with the element (20).

4. A device (10) according to claim 1, claim 1, characterized in that the film (26) has contact on at least two sides of the wall (38), wherein the film (26) is inserted in a U-shaped manner.

5. A device (10) according to claim 1, claim 1, characterized in that the recess (26) features a U-shaped cross section.

6. A device (10) according to claim 1, characterized in that the printed circuit board (14) is arranged on a plug holder (16), which is in at least partial positive connection with the element (20).

7. A device (10) for a thermal coupling of a temperature sensor (12) to an element (20) whose temperature is to be determined, wherein the temperature sensor (12) and the element (20) are connected together at least thermally by means of a heat-conducting medium, characterized in that the temperature sensor (12) is arranged in a recess (26) of the element (20) and the medium includes a flexible film (28), which is in at least partial contact with the temperature sensor (12) and with a wall (38) of the recess (26), and characterized in that the element (20) is a heat sink (22).

8. A device (10) according to claim 7, characterized in that the temperature sensor (12) includes a SMD component (18).

9. A device (10) according to claim 7, characterized in that the film (28) is compressible.

10. A device (10) according to claim 7, characterized in that the film (26) has contact on at least two sides of the wall (38), wherein the film (26) is inserted in a U-shaped manner.

11. A device (10) according to claim 7, characterized in that the recess (26) features a U-shaped cross section.

12. A device (10) according to claim 7, characterized in that the temperature sensor (12) is arranged on a printed circuit board (14).

13. A device (10) according to claim 12, characterized in that semiconductor elements (32) are arranged on the printed circuit board (14), which are in electrical contact with the printed circuit board (14) and are in thermal contact with the element (20).

14. A device (10) according to claim 12, characterized in that the printed circuit board (14) is arranged on a plug holder (16), which is in at least partial positive connection with the element (20).

15. A device (10) for a thermal coupling of a temperature sensor (12) to an element (20) whose temperature is to be determined, wherein the temperature sensor (12) and the element (20) are connected together at least thermally by means of a heat-conducting medium, characterized in that the temperature sensor (12) is arranged in a recess (26) of the element (20) and the medium includes a flexible film (28), which is in at least partial contact with the temperature sensor (12) and with a wall (38) of the recess (26), characterized in that the film (28) is compressible and characterized in that the temperature sensor (12) is arranged on a printed circuit board (14).

16. A device (10) according to claim 15, characterized in that the temperature sensor (12) includes a SMD component (18).

17. A device (10) according to claim 16, characterized in that semiconductor elements (32) are arranged on the printed circuit board (14), which are in electrical contact with the printed circuit board (14) and are in thermal contact with the element (20).

18. A device (10) according to claim 17, characterized in that the film (26) has contact on at least two sides of the wall (38), wherein the film (26) is inserted in a U-shaped manner.

19. A device (10) according to claim 18, characterized in that the recess (26) features a U-shaped cross section.

20. A device (10) according to claim 19, characterized in that the element (20) is a heat sink (22).

21. A device (10) according to claim 20, characterized in that the printed circuit board (14) is arranged on a plug holder (16), which is in at least partial positive connection with the element (20).

* * * * *